(12) United States Patent
Hojsik et al.

(10) Patent No.: US 10,749,692 B2
(45) Date of Patent: Aug. 18, 2020

(54) AUTOMATED CERTIFICATE ENROLLMENT FOR DEVICES IN INDUSTRIAL CONTROL SYSTEMS OR OTHER SYSTEMS

(71) Applicant: Honeywell International Inc., Morris Plains, NJ (US)

(72) Inventors: Michal Hojsik, Prague (CZ); Lukas Pohanka, Prague (CZ); Harshal S. Haridas, Jamison, PA (US)

(73) Assignee: Honeywell International Inc., Morris Plains, NJ (US)

( * ) Notice: Subject to any disclaimer, the term of this patent is extended or adjusted under 35 U.S.C. 154(b) by 285 days.

(21) Appl. No.: 15/891,095

(22) Filed: Feb. 7, 2018

(65) Prior Publication Data

US 2018/0323977 A1 Nov. 8, 2018

Related U.S. Application Data

(60) Provisional application No. 62/501,846, filed on May 5, 2017.

(51) Int. Cl.
| | |
|---|---|
| G06F 21/00 | (2013.01) |
| H04L 29/06 | (2006.01) |
| H04L 9/32 | (2006.01) |
| H04L 9/08 | (2006.01) |
| H04L 29/08 | (2006.01) |

(52) U.S. Cl.
CPC .......... *H04L 9/3268* (2013.01); *H04L 9/0825* (2013.01); *H04L 9/3247* (2013.01); *H04L 63/061* (2013.01); *H04L 63/101* (2013.01); *H04L 67/12* (2013.01); *H04L 63/02* (2013.01); *H04L 63/0823* (2013.01)

(58) Field of Classification Search
CPC ..... H04L 9/3268; H04L 67/12; H04L 63/061; H04L 63/101; H04L 9/0825; H04L 9/3247; H04L 63/0823; H04L 63/02
See application file for complete search history.

(56) References Cited

U.S. PATENT DOCUMENTS

| | | |
|---|---|---|
| 5,371,794 A | 12/1994 | Diffie et al. |
| 5,519,603 A | 5/1996 | Allbery, Jr. et al. |

(Continued)

FOREIGN PATENT DOCUMENTS

| | | | |
|---|---|---|---|
| CN | 105721489 A | * | 6/2016 |
| EP | 1081895 A1 | | 3/2001 |

(Continued)

OTHER PUBLICATIONS

International Search Report dated Aug. 27, 2018 in connection with International Patent Application No. PCT/US2018/030608, 3 pages.

(Continued)

*Primary Examiner* — Lisa C Lewis (57) ABSTRACT

A method includes receiving, from a device, (i) a certificate request for a certification authority and (ii) a first digital certificate. The certificate request is digitally signed by the first device, and the first digital certificate is stored in the device. The method also includes verifying, at the certification authority, the first digital certificate using a second digital certificate of another certification authority. The method further includes verifying a digital signature of the certificate request using the first digital certificate. In addition, the method includes, after verifying the first digital certificate and the digital signature, transmitting a second digital certificate to the device.

20 Claims, 6 Drawing Sheets

(56) References Cited

U.S. PATENT DOCUMENTS

| | | | |
|---|---|---|---|
| 5,749,053 A | 5/1998 | Kusaki et al. | |
| 6,192,232 B1 | 2/2001 | Iseyama | |
| 6,243,695 B1 | 6/2001 | Assaleh et al. | |
| 6,256,297 B1 | 7/2001 | Haferbeck et al. | |
| 6,427,071 B1 | 7/2002 | Adams et al. | |
| 6,560,656 B1 | 5/2003 | O'Sullivan et al. | |
| 6,631,416 B2 | 10/2003 | Bendinelli et al. | |
| 6,850,486 B2 | 2/2005 | Saleh et al. | |
| 6,917,584 B2 | 7/2005 | Kuwabara | |
| 6,983,994 B2 | 1/2006 | Pino | |
| 6,990,379 B2 | 1/2006 | Gonzales et al. | |
| 7,016,499 B2 | 3/2006 | Perlman | |
| 7,069,580 B1 | 6/2006 | Deitz et al. | |
| 7,240,366 B2 | 7/2007 | Buch et al. | |
| 7,275,157 B2 | 9/2007 | Cam Winget | |
| 7,284,278 B2 | 10/2007 | Anson et al. | |
| 7,444,508 B2 | 10/2008 | Karjala et al. | |
| 7,472,269 B2 | 12/2008 | Perkins et al. | |
| 7,486,651 B2 | 2/2009 | Hagiwara et al. | |
| 7,526,644 B2 | 4/2009 | Kocher | |
| 7,546,456 B2 | 6/2009 | Le et al. | |
| 7,593,527 B2 | 9/2009 | Beeson | |
| 7,644,270 B1* | 1/2010 | Cherukumudi | H04L 63/0823 |
| | | | 709/206 |
| 7,657,946 B2 | 2/2010 | Yan | |
| 7,707,406 B2 | 4/2010 | Qiu | |
| 7,860,485 B2 | 12/2010 | Moore et al. | |
| 7,933,410 B2 | 4/2011 | Fahrny | |
| 8,055,910 B2 | 11/2011 | Kocher et al. | |
| 8,280,057 B2 | 10/2012 | Budampati et al. | |
| 8,311,214 B2 | 11/2012 | Buskey et al. | |
| 8,381,306 B2 | 2/2013 | McPherson et al. | |
| 8,412,927 B2 | 4/2013 | Kwan et al. | |
| 8,429,435 B1 | 4/2013 | Clayton et al. | |
| 8,627,083 B2 | 1/2014 | Qiu et al. | |
| 8,635,442 B2* | 1/2014 | Agrawal | H04L 9/3268 |
| | | | 713/155 |
| 8,681,676 B2 | 3/2014 | Budampati et al. | |
| 8,775,790 B2 | 7/2014 | Hidle | |
| 8,873,746 B2 | 10/2014 | Long et al. | |
| 8,943,323 B1 | 1/2015 | Brown et al. | |
| 9,038,162 B2 | 5/2015 | Hagiu et al. | |
| 9,635,003 B1 | 4/2017 | Lackey et al. | |
| 2002/0146127 A1 | 10/2002 | Wong | |
| 2002/0174366 A1 | 11/2002 | Peterka et al. | |
| 2003/0005149 A1 | 1/2003 | Haas et al. | |
| 2003/0061481 A1 | 3/2003 | Levine et al. | |
| 2003/0088650 A1 | 5/2003 | Fassold et al. | |
| 2003/0151513 A1 | 8/2003 | Herrmann et al. | |
| 2004/0015262 A1 | 1/2004 | Brown et al. | |
| 2004/0103165 A1 | 5/2004 | Nixon et al. | |
| 2004/0153171 A1 | 8/2004 | Brandt et al. | |
| 2004/0177264 A1 | 9/2004 | Anson et al. | |
| 2004/0247126 A1 | 12/2004 | McClellan | |
| 2005/0060584 A1 | 3/2005 | Ginter et al. | |
| 2005/0102514 A1 | 5/2005 | Bergenwall et al. | |
| 2005/0177751 A1 | 8/2005 | Chmora et al. | |
| 2005/0201349 A1 | 9/2005 | Budampati | |
| 2005/0251680 A1 | 11/2005 | Brown et al. | |
| 2005/0254653 A1 | 11/2005 | Potashnik et al. | |
| 2005/0256735 A1 | 11/2005 | Bayne | |
| 2005/0281215 A1 | 12/2005 | Budampati et al. | |
| 2006/0002368 A1 | 1/2006 | Budampati et al. | |
| 2006/0045267 A1 | 3/2006 | Moore et al. | |
| 2006/0059372 A1 | 3/2006 | Fayar et al. | |
| 2006/0083200 A1 | 4/2006 | Emeott et al. | |
| 2006/0116170 A1 | 6/2006 | Brahmbhatt et al. | |
| 2006/0140411 A1 | 6/2006 | Zhu | |
| 2006/0153370 A1 | 7/2006 | Beeson | |
| 2006/0171344 A1 | 8/2006 | Subramanian et al. | |
| 2006/0171346 A1 | 8/2006 | Kolavennu et al. | |
| 2006/0205386 A1 | 9/2006 | Yu et al. | |
| 2006/0211447 A1 | 9/2006 | Purkayastha et al. | |
| 2006/0227729 A1 | 10/2006 | Budampati et al. | |
| 2006/0253703 A1 | 11/2006 | Eronen et al. | |
| 2006/0274644 A1 | 12/2006 | Budampati et al. | |
| 2006/0274671 A1 | 12/2006 | Budampati et al. | |
| 2006/0282876 A1 | 12/2006 | Shelest et al. | |
| 2006/0285529 A1 | 12/2006 | Hares et al. | |
| 2006/0287001 A1 | 12/2006 | Budampati et al. | |
| 2006/0291438 A1 | 12/2006 | Karschnia et al. | |
| 2007/0030816 A1 | 2/2007 | Kolavennu | |
| 2007/0030832 A1 | 2/2007 | Gonia et al. | |
| 2007/0076638 A1 | 4/2007 | Kore et al. | |
| 2007/0077941 A1 | 4/2007 | Gonia et al. | |
| 2007/0081824 A1 | 4/2007 | Chiu et al. | |
| 2007/0087763 A1 | 4/2007 | Budampati et al. | |
| 2007/0091825 A1 | 4/2007 | Budampati et al. | |
| 2007/0097904 A1 | 5/2007 | Mukherjee et al. | |
| 2007/0153677 A1 | 7/2007 | McLaughlin et al. | |
| 2007/0155423 A1 | 7/2007 | Carmody et al. | |
| 2007/0199046 A1 | 8/2007 | O'Brien | |
| 2007/0255966 A1 | 11/2007 | Condorelli et al. | |
| 2007/0283443 A1 | 12/2007 | McPherson et al. | |
| 2008/0031155 A1 | 2/2008 | Korus et al. | |
| 2008/0063204 A1 | 3/2008 | Braskich et al. | |
| 2008/0085004 A1 | 4/2008 | Kitaj et al. | |
| 2008/0086632 A1 | 4/2008 | Kagle | |
| 2008/0186202 A1 | 8/2008 | Vaswani et al. | |
| 2008/0226073 A1 | 9/2008 | Hawkes et al. | |
| 2008/0263647 A1 | 10/2008 | Barnett et al. | |
| 2008/0273547 A1 | 11/2008 | Phinney | |
| 2008/0292105 A1 | 11/2008 | Wan et al. | |
| 2009/0177289 A1 | 7/2009 | Glanzer et al. | |
| 2009/0222902 A1* | 9/2009 | Bender | H04L 63/0823 |
| | | | 726/10 |
| 2009/0265550 A1 | 10/2009 | Bahr et al. | |
| 2009/0276537 A1 | 11/2009 | Deverick et al. | |
| 2010/0031025 A1 | 2/2010 | Zhang et al. | |
| 2010/0050267 A1 | 2/2010 | Nochta | |
| 2010/0161817 A1 | 6/2010 | Xiao et al. | |
| 2011/0182427 A1 | 7/2011 | Long et al. | |
| 2011/0231450 A1 | 9/2011 | Sinha et al. | |
| 2012/0117380 A1 | 5/2012 | Herberth et al. | |
| 2012/0174182 A1 | 7/2012 | Neely | |
| 2012/0266214 A1 | 10/2012 | Hagiu et al. | |
| 2013/0031360 A1 | 1/2013 | Dewitz et al. | |
| 2013/0111211 A1 | 5/2013 | Winslow et al. | |
| 2013/0198799 A1 | 8/2013 | Staggs et al. | |
| 2013/0254636 A1 | 9/2013 | Kirkpatrick et al. | |
| 2013/0311779 A1* | 11/2013 | Sherkin | H04L 9/006 |
| | | | 713/175 |
| 2014/0007253 A1 | 1/2014 | Hardt | |
| 2014/0013105 A1* | 1/2014 | Niemeyer | G06F 21/33 |
| | | | 713/156 |
| 2014/0281497 A1* | 9/2014 | Medvinsky | H04L 9/006 |
| | | | 713/156 |
| 2015/0052351 A1 | 2/2015 | Haghighi et al. | |
| 2015/0215338 A1 | 7/2015 | Haridas et al. | |
| 2015/0215339 A1 | 7/2015 | Chernoguzov et al. | |
| 2015/0244742 A1 | 8/2015 | Reynolds et al. | |
| 2016/0127353 A1 | 5/2016 | Thomas et al. | |
| 2016/0365984 A1 | 12/2016 | Lee et al. | |
| 2017/0155511 A1 | 6/2017 | Haridas et al. | |
| 2018/0007033 A1* | 1/2018 | Ajitomi | H04L 63/0442 |
| 2018/0234255 A1* | 8/2018 | Fu | H04L 9/0825 |

FOREIGN PATENT DOCUMENTS

| | | |
|---|---|---|
| EP | 1439667 A2 | 7/2004 |
| EP | 1545074 A1 | 6/2005 |
| WO | 2005/010214 A2 | 2/2005 |
| WO | 2006/003532 A1 | 1/2006 |

OTHER PUBLICATIONS

Written Opinion of the International Searching Authority dated Aug. 27, 2018 in connection with International Patent Application No. PCT/US2018/030608, 7 pages.

Communication pursuant to Article 94(3) EPC dated Dec. 17, 2010 in connection with European Patent Application No. 08 16 3537.7, 6 pages.

International Search Report dated Apr. 28, 2015 in connection with International Application No. PCT/US2015/015337, 3 pages.
Written Opinion of the International Searching Authority dated Apr. 28, 2015 in connection with International Application No. PCT/US2015/015337, 4 pages.
"How IPSec Works", Microsoft Corp., Mar. 2003, 31 pages.
"IPsec", Wikipedia, Aug. 2014, 10 pages.
European Search Report dated Jun. 15, 2015 in connection with European Patent Application No. EP 14 19 2912, 7 pages.
Bill Croft et al., "Bootstrap Protocol (BOOTP)", Network Working Group, Sep. 1985, 12 pages.
S. Alexander et al., "DHCP Options and BOOTP Vendor Extensions", Network Working Group, Mar. 1997, 34 pages.
"Bootstrap Protocol", Wikipedia, Mar. 2014, 3 pages.
International Search Report dated Apr. 28, 2015 in connection with International Application No. PCT/US2015/011937, 3 pages.
Written Opinion of the International Searching Authority dated Apr. 28, 2015 in connection with International Application No. PCT/US2015/011937, 6 pages.
Lukas Pohanka et al., "Apparatus and Method for Encapsulation of Profile Certificate Private Keys or Other Data", U.S. Appl. No. 15/675,656, filed Aug. 11, 2017, 36 pages.
Dongyan Chen et al., "Dependability Enhancement for IEEE 802.11 Wireless LAN with Redundancy Techniques," Proceedings of the 2003 International Conference on Dependable Systems and Networks, Jun. 2003, 8 pages.

"XYR 5000 Wireless Transmitters—Honeywell Solutions for Wireless Data Acquisition and Monitoring", Honeywell, Feb. 2006, 6 pages.
Dr. Soumitri Kolavennu, Presentation, "WNSIA MAC Layer", ISA SP100 meeting, Feb. 2007, 24 pages.
"IP/MPLS-Based VPNS, Layer-3 vs. Layer-2", Foundry Networks, 2002, 16 pages.
European Search Report dated Aug. 24, 2009 in connection with European Patent Application No. EP 08 16 3537, 5 pages.
Partial European Search Report dated Apr. 28, 2009 in connection with European Patent Application No. EP 08 16 3537, 5 pages.
Communication pursuant to Article 94(3) EPC dated Oct. 28, 2009 in connection with European Patent Application No. EP 08 163 537.7, 5 pages.
Arvinderpal S. Wandert et al., "Energy Analysis of Public-Key Cryptography for Wireless Sensor Networks", Proceedings of the 3rd IEEE International Conference on Pervasive Computing and Communications (PerCom 2005), Mar. 2005, 5 pages.
Ajay Mahimkar, "SecureDAV: A Secure Data Aggregation and Verification Protocol for Sensor Networks," IEEE Communications Society, Nov. 2004, p. 2175-2179.

* cited by examiner

AUTOMATED CERTIFICATE ENROLLMENT FOR DEVICES IN INDUSTRIAL CONTROL SYSTEMS OR OTHER SYSTEMS

CROSS-REFERENCE TO RELATED APPLICATION AND PRIORITY CLAIM

This application claims priority under 35 U.S.C. § 119(e) to U.S. Provisional Patent Application No. 62/501,846 filed on May 5, 2017. This provisional application is hereby incorporated by reference in its entirety.

TECHNICAL FIELD

This disclosure generally relates to computing and device security. More specifically, this disclosure relates to automated certificate enrollment for devices in industrial control systems or other systems.

BACKGROUND

Industrial control systems (ICSs) are routinely used to monitor and control complex industrial processes. As these systems have evolved from closed proprietary systems to connected open systems over the years, security has become more of a concern. This is because these systems have become more vulnerable to exploits due to the widespread knowledge about open system vulnerabilities. One common approach to providing security in industrial control systems involves the use of encryption based on public key certificates.

SUMMARY

This disclosure provides automated certificate enrollment for devices in industrial control systems or other systems.

In a first embodiment, a method includes receiving, from a device, (i) a certificate request for a certification authority and (ii) a first digital certificate. The certificate request is digitally signed by the first device, and the first digital certificate is stored in the device. The method also includes verifying, at the certification authority, the first digital certificate using a second digital certificate of another certification authority. The method further includes verifying a digital signature of the certificate request using the first digital certificate. In addition, the method includes, after verifying the first digital certificate and the digital signature, transmitting a second digital certificate to the device.

In a second embodiment, an apparatus is configured to provide a certification authority and includes at least one processor. The at least one processor is configured to receive, from a device, (i) a certificate request for the certification authority and (ii) a first digital certificate. The certificate request is digitally signed by the first device, and the first digital certificate is stored in the device. The at least one processor is also configured to verify the first digital certificate using a second digital certificate of another certification authority. The at least one processor is further configured to verify a digital signature of the certificate request using the first digital certificate. In addition, the at least one processor is configured, after verifying the first digital certificate and the digital signature, to initiate transmission of a second digital certificate to the device.

In a third embodiment, a method includes generating a key pair having first and second keys associated with a device. The method also includes generating a certificate request associated with the key pair and digitally signing the certificate request. The method further includes transmitting the certificate request and a first digital certificate stored in the device to a certification authority. In addition, the method includes, in response to the certification authority verifying the first digital certificate and a digital signature of the certificate request, receiving a second digital certificate from the certification authority and storing the second digital certificate in the device.

In a fourth embodiment, an apparatus includes at least one memory configured to store a first digital certificate and at least one processor. The at least one processor is configured to generate a key pair having first and second keys associated with the apparatus. The at least one processor is also configured to generate a certificate request associated with the key pair and digitally sign the certificate request. The at least one processor is further configured to initiate transmission of the certificate request and the first digital certificate to a certification authority. In addition, the at least one processor is configured, in response to the certification authority verifying the first digital certificate and a digital signature of the certificate request, to receive a second digital certificate from the certification authority and store the second digital certificate in the at least one memory.

In a fifth embodiment, a non-transitory computer readable medium contains instructions that when executed cause at least one processing device to perform the method of the first embodiment. In a sixth embodiment, a non-transitory computer readable medium contains instructions that when executed cause at least one processing device to perform the method of the third embodiment.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, one common approach to providing security in industrial control systems involves the use of encryption based on public key certificates. Unfortunately, various problems can arise when attempting to integrate an industrial automation device or other device into an industrial control system or other system.

Often times, the device being installed needs to obtain a public key certificate, such as an x.509 certificate, from a certification authority (CA) that is previously unknown to the device. An example of this is when a customer wishes to enroll an industrial automation device with the customer's own certification authority (rather than the device manufacturer's certification authority). Certificate enrollment protocols often require a one-time password to be used for each certificate request. For instance, one common enrollment process occurs as follows. A password generated on a certification authority is delivered over a secure channel to the requesting device, which places the password into a certificate signing request (CSR) that is sent to the certification authority over a secure channel. The use of a password complicates the certificate enrollment process since it requires a password transfer from the certification authority to the device over a secure channel, which might not exist yet. As a result, the password often has to be manually transferred to the device, which may not be practical in large-scale or other deployments.

This disclosure provides techniques that allow devices to automatically enroll for key certificates. Among other things, the techniques described in this patent document can be fully automated, and device whitelisting can optionally be used to make the techniques more secure. Note that while often described below as being used for embedded devices within industrial control systems, the techniques described in this patent document could be used with any other suitable devices, and those devices could be used in any other suitable systems. Also, note that while often described below as involving device manufacturers and device users (customers), the techniques described in this patent document could be used by any other suitable parties.

Figure 1:
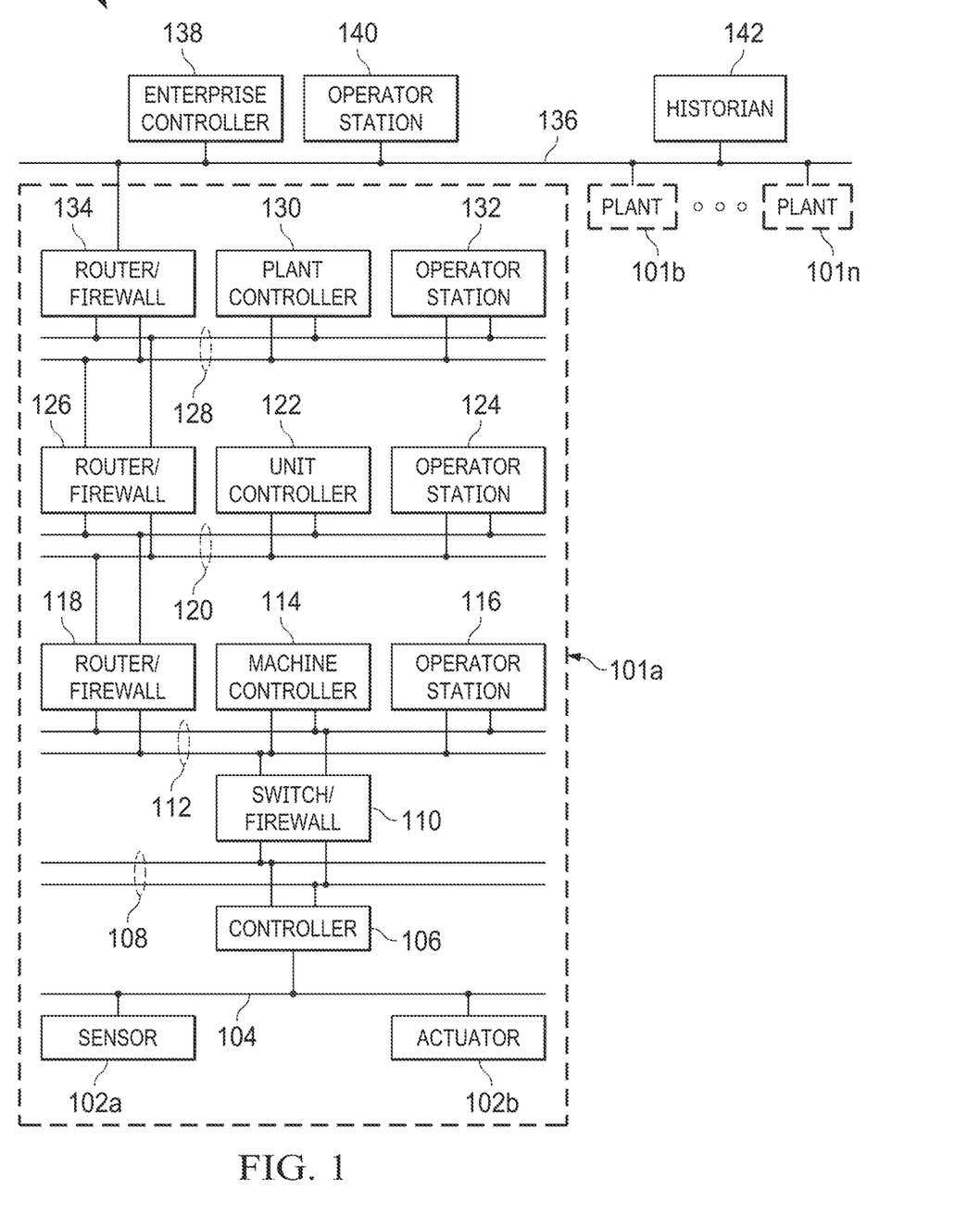
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system, a WINDOWS operating system, or other operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system or other operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system or other operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system or other operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system or other operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system or other operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system or other operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system or other operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system or other operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

One or more of the devices shown in FIG. 1 could support a technique for automated certificate enrollment. This allows the one or more devices to obtain public key certificates, such as x.509 certificates, from a certification authority that is previously unknown to the devices. As a result, an owner or operator of the system 100 can obtain the devices from one or more manufactures, vendors, or other organizations, install the devices in the system 100, and allow the devices to obtain the public key certificates from a desired certification authority. Additional details regarding these techniques are provided below.

Although FIG. 1 illustrates one example of an industrial process control and automation system 100, various changes may be made to FIG. 1. For example, a control and automation system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which techniques for automated certificate enrollment can be used. This functionality can be used in any other suitable device or system, and that device or system need not be used for industrial process control and automation.

Figure 2:
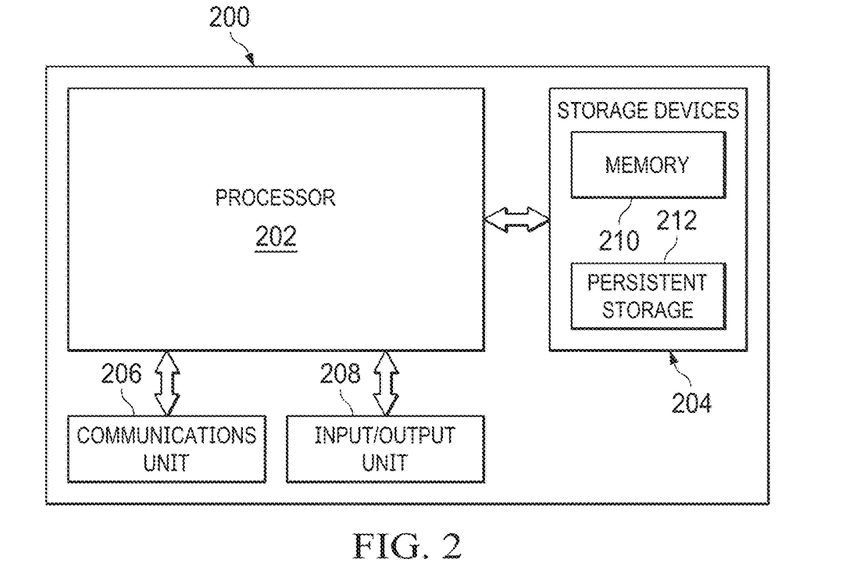
FIG. 2 illustrates an example device supporting a technique for automated certificate enrollment according to this disclosure.

FIG. 2 illustrates an example device 200 supporting a technique for automated certificate enrollment according to this disclosure. The device 200 could, for example, represent any of the devices shown in FIG. 1 and described above. However, the device 200 could represent any other suitable device or system that implements one or more techniques for automated certificate enrollment, whether or not used for industrial process control and automation.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, central processing units (CPUs), digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory (like an EEPROM), hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 is not required for automated certificate enrollment to work as intended.

Any other or additional components could be used in the device 200 depending on the desired functionality or application of the device 200. For example, in an industrial control system (such as the system 100), the device 200 could include components supporting sensor functionality, actuator functionality, or controller functionality. As particular examples, the device 200 could include one or more components that measure at least one process variable value of an industrial process or one or more components that alter at least one aspect of the industrial process. In general, the device 200 could include any suitable components that perform any desired functionality, as long as the device 200 supports automated certificate enrollment.

Although FIG. 2 illustrates one example of a device 200 supporting a technique for automated certificate enrollment, various changes may be made to FIG. 2. For example, various components in FIG. 2 could be combined, further subdivided, or omitted and additional components could be added according to particular needs. Also, computing devices and other devices that perform automated certificate enrollment can come in a wide variety of configurations, and FIG. 2 does not limit this disclosure to any particular configuration of device.

Figure 3:
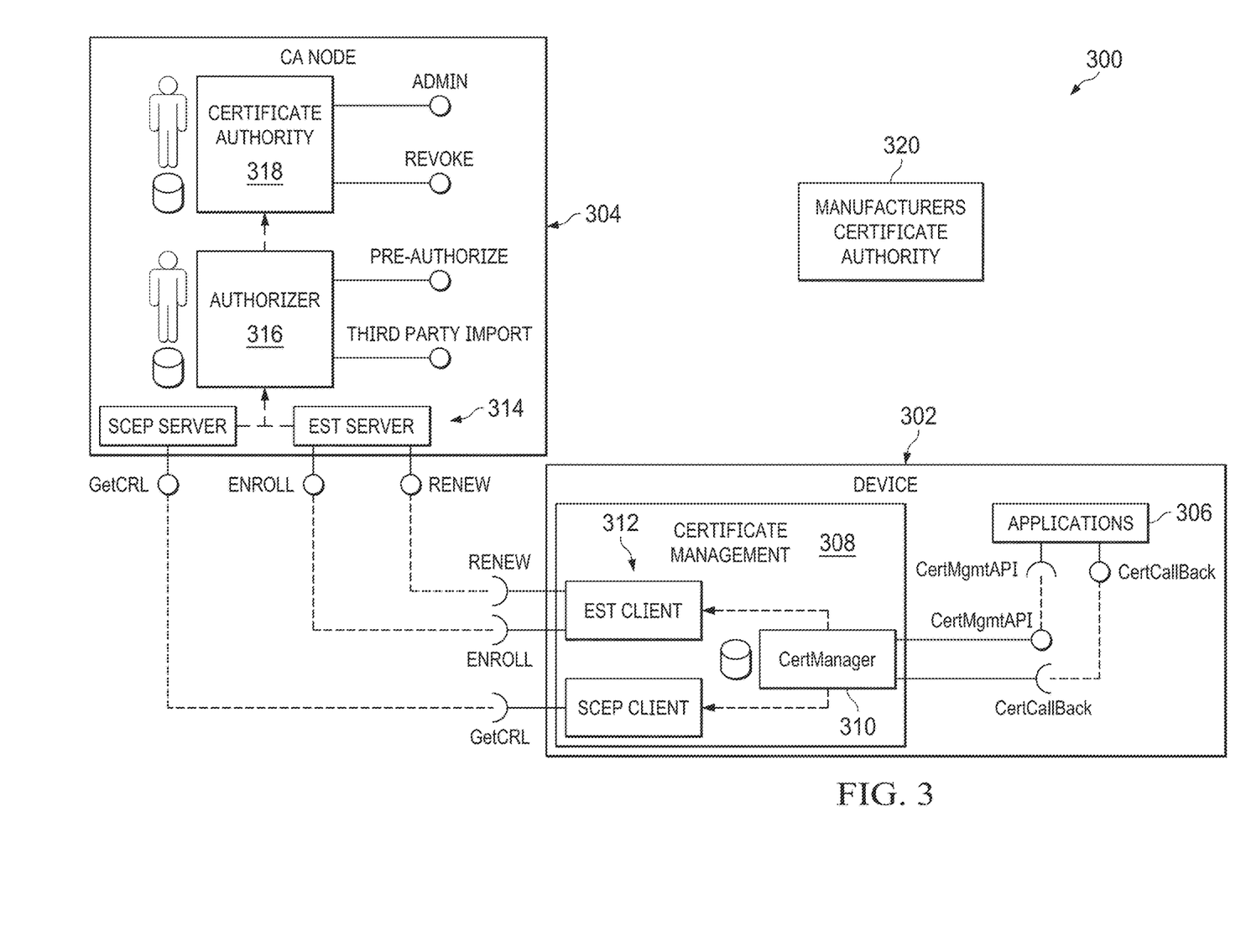
FIG. 3 illustrates an example architecture for automated certificate enrollment according to this disclosure.

FIG. 3 illustrates an example architecture 300 for automated certificate enrollment according to this disclosure. As shown in FIG. 3, the architecture 300 involves the use of a device 302 and a certification authority (CA) node 304. The device 302 represents any suitable device configured to engage in automated certificate enrollment, such as the device 200 of FIG. 2 or any suitable device in the system 100 of FIG. 1. The CA node 304 represents any suitable device or system configured to function as a certificate authority and to provide x.509 certificates or other key certificates. In some embodiments, the CA node 304 could include at least one computing device having one or more processors, one or more memories, one or more communications units, and optionally one or more I/O units, such as in the arrangement shown in FIG. 2.

The device 302 in this example includes one or more applications 306 and a certificate management subsystem 308. The applications 306 could include any suitable applications supporting any suitable functionality in the device 302. For example, the applications 306 could include sensing logic used to sense one or more characteristics of an industrial process, actuation logic used to adjust one or more characteristics of an industrial process, or control logic used to control one or more components of an industrial process control and automation system. At least one of the applications 306 could support the use of key certificates, which are obtained by the certificate management subsystem 308.

The certificate management subsystem 308 controls the enrollment of the device 302 with the CA node 304 and obtains one or more key certificates from the CA node 304. In this example, the certificate management subsystem 308 includes a certificate manager 310 and multiple clients 312 used to interact with the CA node 304. The certificate manager 310 denotes an application or other logic performed by the device 302 to request and use key certificates. The clients 312 denote applications or other logic that allows the certificate manager 310 to interact with the CA node 304 using different protocols.

In this example, one or more of the applications 306 can interact with the certificate manager 310 using an Application Programming Interface (API), and the certificate manager 310 can respond to the application(s) 306 in the form of one or more callbacks. Thus, an application 306 can invoke functions of the certificate manager 310 via the API, such as by sending a request for the certificate manager 310 to obtain a key certificate from the CA node 304. The certificate manager 310 can obtain the key certificate using one or more of the clients 312 and return the key certificate to the application 306 using a callback.

In this particular example, the clients 312 support the use of a Simple Certificate Enrollment Protocol (SCEP) and an Enrollment over Secure Transport (EST) protocol. The SCEP client 312 can interact with the CA node 304 by sending a certificate retrieval command (GetCRL) to the CA node 304, and the CA node 304 can respond by returning the appropriate certificate to the SCEP client 312. The EST client 312 can interact with the CA node 304 by sending certificate enrollment (Enroll) and renewal (Renew) commands to the CA node 304, and the CA node 304 can respond by returning the appropriate certificate to the EST client 312. However, any other or additional protocol(s) could be supported by the certificate management subsystem 308, and the certificate management subsystem 308 need not support both SCEP and EST. In some embodiments, the clients 312 could be implemented using security technology from MOCANA CORP.

The CA node 304 denotes a certification authority used by a customer or other entity that is attempting to register the device 302. The CA node 304 is different from a device manufacturer's CA node 320. As described in more detail below, the device manufacturer can set up the CA node 320 and, for each device 302 that is manufactured, the CA node 320 can provide a device certificate signed by the CA node 320 to the device 302. The manufacturer's device certificates are used later for certificate provisioning by the CA node 304. In some embodiments, the CA node 320 could include one or more processors, one or more memories, one or more communications units, and optionally one or more I/O units, such as in the arrangement shown in FIG. 2.

The CA node 304 in this example includes multiple servers 314, which support interactions with various devices (including the device 302) to provide key certificates using multiple protocols. Again, the SCEP and EST protocols are shown here. However, any other or additional protocol(s) could also be supported, and the CA node 304 need not support both SCEP and EST.

An authorizer 316 denotes an application or other logic that interacts with the device 302, a certificate authority 318, and the manufacturer's CA node 320 in order to provide key certificates to devices, including the device 302. The authorizer 316 can be used to verify a one-time password sent by the device 302 if the device 302 is able to provide the password. If not (such as for the reasons described above), the authorizer 316 can verify a serial number or other identifier sent by the device 302 as part of the manufacturer's device certificate or otherwise obtained against a whitelist (which can be maintained by the certificate authority 318). The certificate authority 318 denotes an application or other logic that generates and provides key certificates to devices, including the device 302. If approved, the authorizer 316 allows the device 302 to interact with the certificate authority 318 in order to obtain a key certificate from the certificate authority 318.

As shown in FIG. 3, the authorizer 316 supports various functions, including a pre-authorization function and a third-party import function. These functions can be used to identify devices that are allowed to receive key certificates from the CA node 304. The certificate authority 318 also supports various functions, including an administration function and a revocation function. These functions can be used to control and revoke the key certificates issued by the certificate authority 318.

Additional details regarding example operations that could occur in the architecture 300 are provided below. Note that these operations are examples only and that other or additional operations could also occur using the architecture 300.

Although FIG. 3 illustrates one example of an architecture 300 for automated certificate enrollment, various changes may be made to FIG. 3. For example, various components in FIG. 3 could be combined, further subdivided, or omitted and additional components could be added according to particular needs. Also, any other or additional protocols could be supported in FIG. 3.

Figure 4:
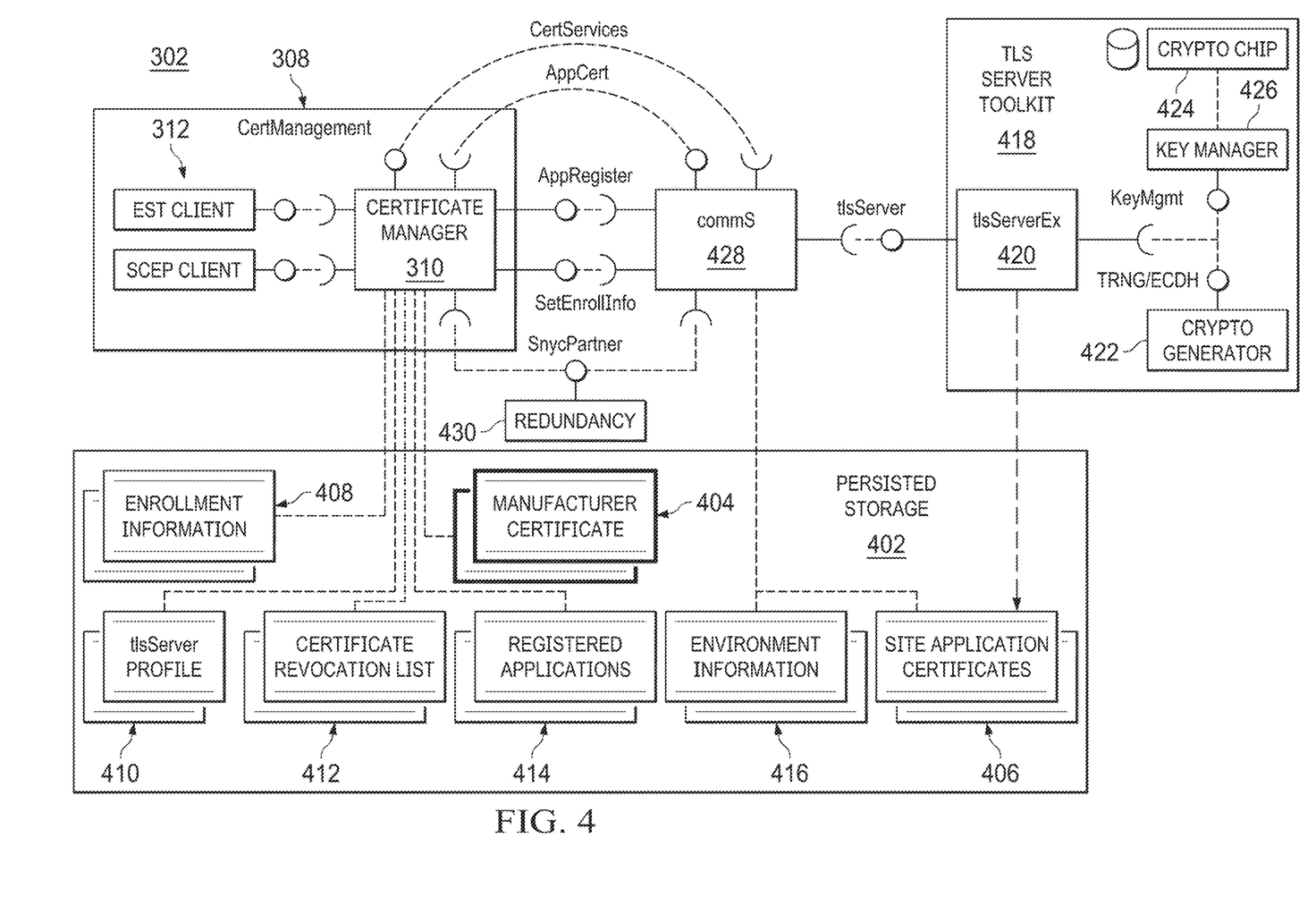
FIG. 4 illustrates additional details of an example device that supports automated certificate enrollment according to this disclosure.

FIG. 4 illustrates additional details of an example device 302 that supports automated certificate enrollment according to this disclosure. As shown in FIG. 4, the device 302 includes a memory 402, which could denote any of the storage devices 204 in FIG. 2. The memory 402 stores various information, including at least one manufacturer's device certificate 404 and at least one site application certificate 406. As described above, the device certificate 404 could represent a certificate provided by the device manufacturer's CA node 320, such as during manufacture of the device 302. Note, however, that the device certificate 404 could be provided at other times and by other entities. Generally, the device certificate 404 can be provided by an entity using a trusted authority at a time when the device 302 is known to be secure. The site application certificate 406 can denote a certificate that is obtained by the device 302 from the customer's CA node 304.

The memory 402 in this example also stores other data used, generated, or collected by the device 302. For example, enrollment information 408 can include information used by the certificate manager 310 to enroll with or otherwise receive key certificates from one or more of the CA nodes 304 and 320. One or more Transport Layer Security (TLS) server profiles 410 can include information used by the device 302 to engage in secure communications with the CA nodes 304 and 320 or other components over a network. One or more certificate revocation lists (CRLs) 412 can include information identifying key certificates that have been revoked and are no longer valid. Registered application information 414 can include information identifying applications of the device 302 that are allowed to request key certificates. Environment information 416 can include information associated with the operational environment in which the device 302 operates, which can be used (among other things) when creating secure communication sessions with the device 302. Any other or additional information associated with the device 302 could be stored in the memory 402.

The device 302 also includes a Transport Layer Security (TLS) server toolkit 418, which provides various functions used to secure communications involving the device 302. In this example, the toolkit 418 includes a TLS server 420, which is able to create or accept encrypted connections via TLS or Secure Sockets Layer (SSL). A cryptographic generator 422 generates data, such as true random number generator (TRNG) values or Elliptic-curve Diffie-Hellman (ECDH) shared secrets, that are used by the toolkit 418. In some embodiments, the cryptographic generator 422 could represent a cryptographic IP core from SILEX INSIDE (previously BARCO-SILEX). A cryptographic chip 424 represents an integrated circuit chip that securely performs cryptographic operations, such as digital signature generation and verification, in order to provide secure authentication. In some embodiments, the cryptographic chip 424 could represent an ATMEL cryptographic chip from MICROCHIP TECHNOLOGY INC. A key manager 426 supports the generation and retrieval of encryption keys, which can be used to (among other things) create and engage in secure communication sessions. The exact implementation of the TLS toolkit 418 here relates to a specific hardware implementation, and various other implementations are possible. It is also possible to omit the TLS toolkit 418 or use other mechanisms for securing communications.

The device 302 may further include a communication module 428 and a redundancy module 430. The communication module 428 supports communications involving various components of the device 302, such as by allowing device configurations or other data to be loaded onto the device 302. The communication module 428 can support communications over any suitable buses or other communication links.

The redundancy module 430 in one device 302 can communicate with the redundancy module 430 in another device 302 so that the devices 302 can exchange data and remain generally synchronized with one another. This allows multiple devices 302 to function as redundant partners in order to increase availability of at least one of the devices 302. This is common in industrial control systems, where redundant devices are used as sensors, actuators, controllers, or other components to help ensure that a failure of one device does not result in a loss of view or control over an industrial process. Note, however, that the redundancy module 430 can be omitted if redundancy is not needed or desired with the device 302.

Although FIG. 4 illustrates additional details of an example device 302 that supports automated certificate enrollment, various changes may be made to FIG. 4. For example, while shown as supporting SCEP and EST, any other or additional protocol(s) could be supported by the device 302. Also, while shown as supporting TLS, any other or additional mechanism(s) can be used to support secure communications with the device 302.

Figure 5:
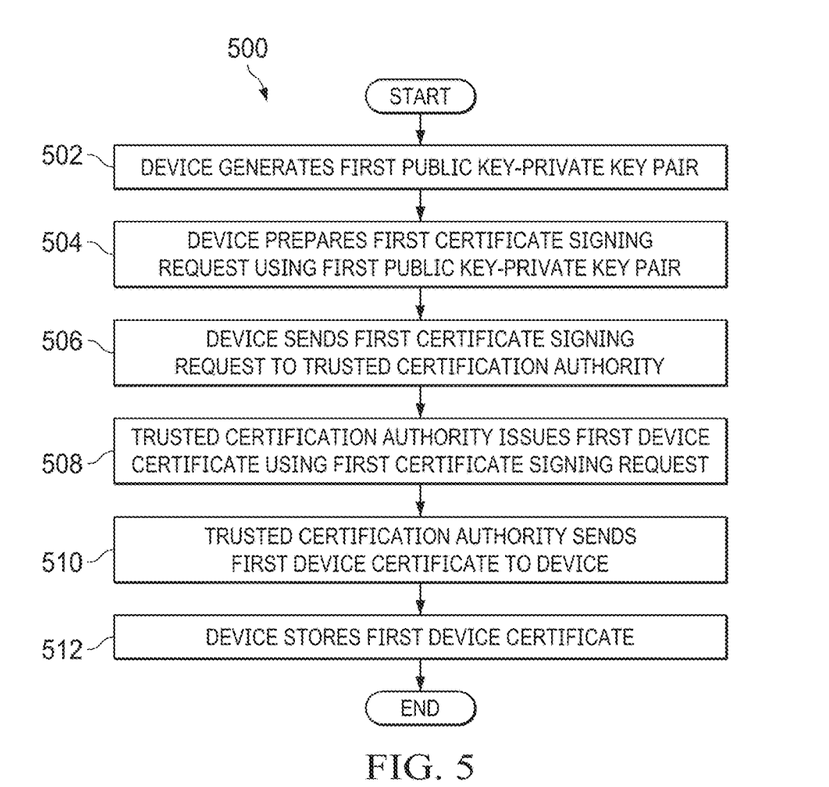
FIG. 5 illustrates an example method for storing a device certificate associated with a manufacturer in a device in accordance with this disclosure.

FIG. 5 illustrates an example method 500 for storing a device certificate associated with a manufacturer in a device in accordance with this disclosure. For ease of explanation, the method 500 is described as being performed using the device 302 and the CA node 320. However, the method 500 could be used by any suitable device and in any suitable system.

As noted above, a manufacturer of the devices 302 uses its CA node 320 to store a device certificate 404 in each device 302. The device certificate 404 is signed by the manufacturer's CA node 320 and can be used for certificate provisioning with the customer's certificate authority 318 implemented by the customer's CA node 304. To enable the customer's certificate authority 318 to verify certificates signed by the manufacturer's CA node 320, the device certificate 404 needs to be trusted by the customer's certificate authority 318.

As shown in FIG. 5, the method 500 can be used to support certificate retrieval and storage during device manufacturing. A device generates a first public key-private key pair at step 502. This could include, for example, the device 302 using its cryptographic chip or processor to generate a first pair of cryptographic keys, including a first public key (denoted PK1) and a first private or secret key (denoted SK1). The device prepares a first certificate signing request using the first public key-private key pair at step 504. This could include, for example, the device 302 using its cryptographic chip or processor to generate a first certificate signing request (denoted CSR1) using the first public key PK1 and the first private or secret key SK1. The first certificate signing request CSR1 requests that a certification authority issue a public key certificate for the device 302, where the public key certificate identifies the device 302 as the owner of the first public key PK1.

The device sends the first certificate signing request to a trusted certification authority at step 506. This could include, for example, the device 302 using its communications unit to transmit the first certificate signing request CSR1 to the device manufacturer's CA node 320. The trusted certification authority issues a first device certificate for the device based on the first certificate signing request at step 508. This could include, for example, the device manufacturer's CA node 320 using its communications unit to receive the first certificate signing request CSR1 from the device 302. This could also include the CA node 320 using its cryptographic chip or processor to generate a first device certificate (denoted Cert1) based on at least some of the contents of the first certificate signing request CSR1. This could further include the CA node 320 using its cryptographic chip or processor to digitally sign the first device certificate Cert1.

The trusted certification authority sends the first device certificate to the device at step 510. This could include, for example, the device manufacturer's CA node 320 using its communications unit to transmit the first device certificate Cert1 to the device 302. The device stores the first device certificate at step 512. This could include, for example, the device 302 using its communications unit to receive the first device certificate Cert1 from the CA node 320. This could also include the device 302 storing the first device certificate Cert1 in a non-volatile (and possibly secure tamper-proof or tamper-resistant) memory 402 as a device certificate 404.

The method 500 shown in FIG. 5 operates based on the fact that the device manufacturer's CA node 320 trusts the device 302 that is being manufactured since the environment in which the device 302 is manufactured is under the device manufacturer's control. Hence, there is no need to authenticate the device 302 towards the CA node 320. The method 500 here could be repeated for each device 302 that is being manufactured.

Although FIG. 5 illustrates one example of a method 500 for storing a device certificate 404 associated with a manufacturer in a device 302, various changes may be made to FIG. 5. For example, while shown as a series of steps, various steps in FIG. 5 could overlap, occur in parallel, occur in a different order, or occur any number of times. Also, while the method 500 is described as being used by a manufacturer of the device 302, the method 500 could be used by other parties associated with the device 302 (such as trusted vendors or other parties).

Figure 6:
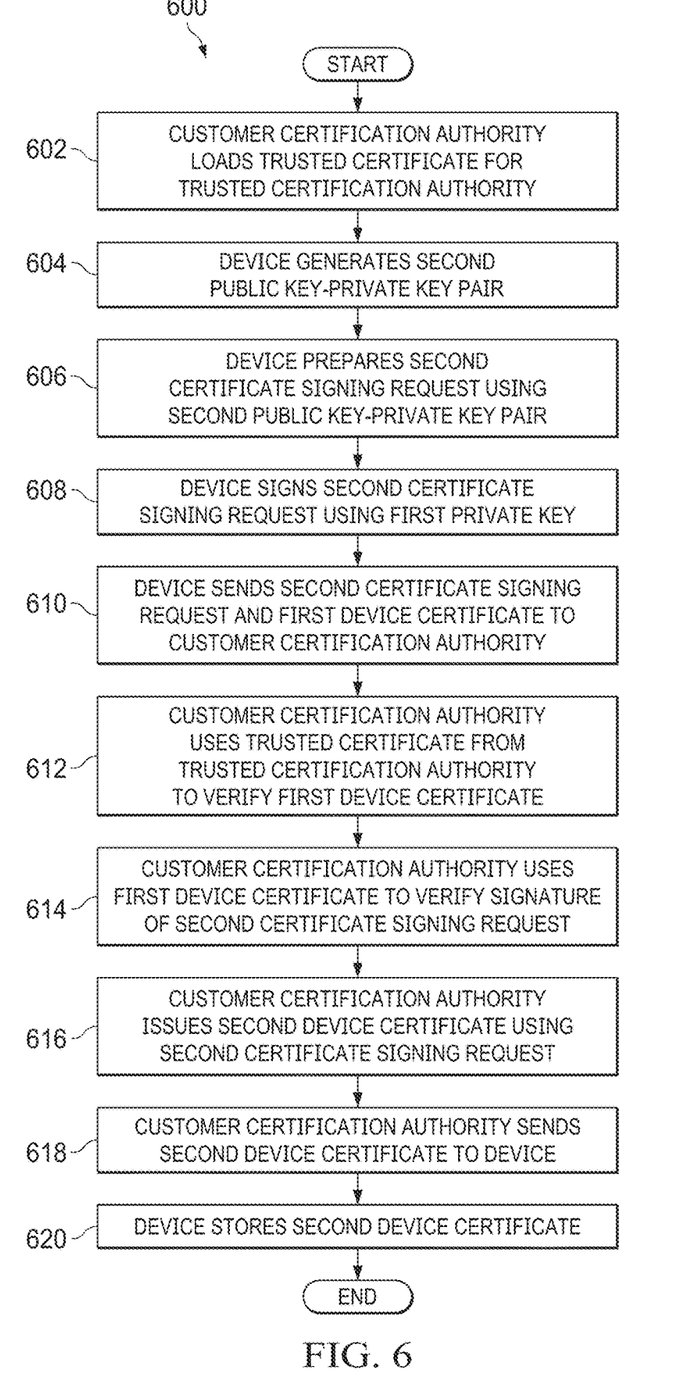
FIGS. 6 and 7 illustrate example methods for automated certificate enrollment for devices in industrial control systems or other systems according to this disclosure.
Figure 7:
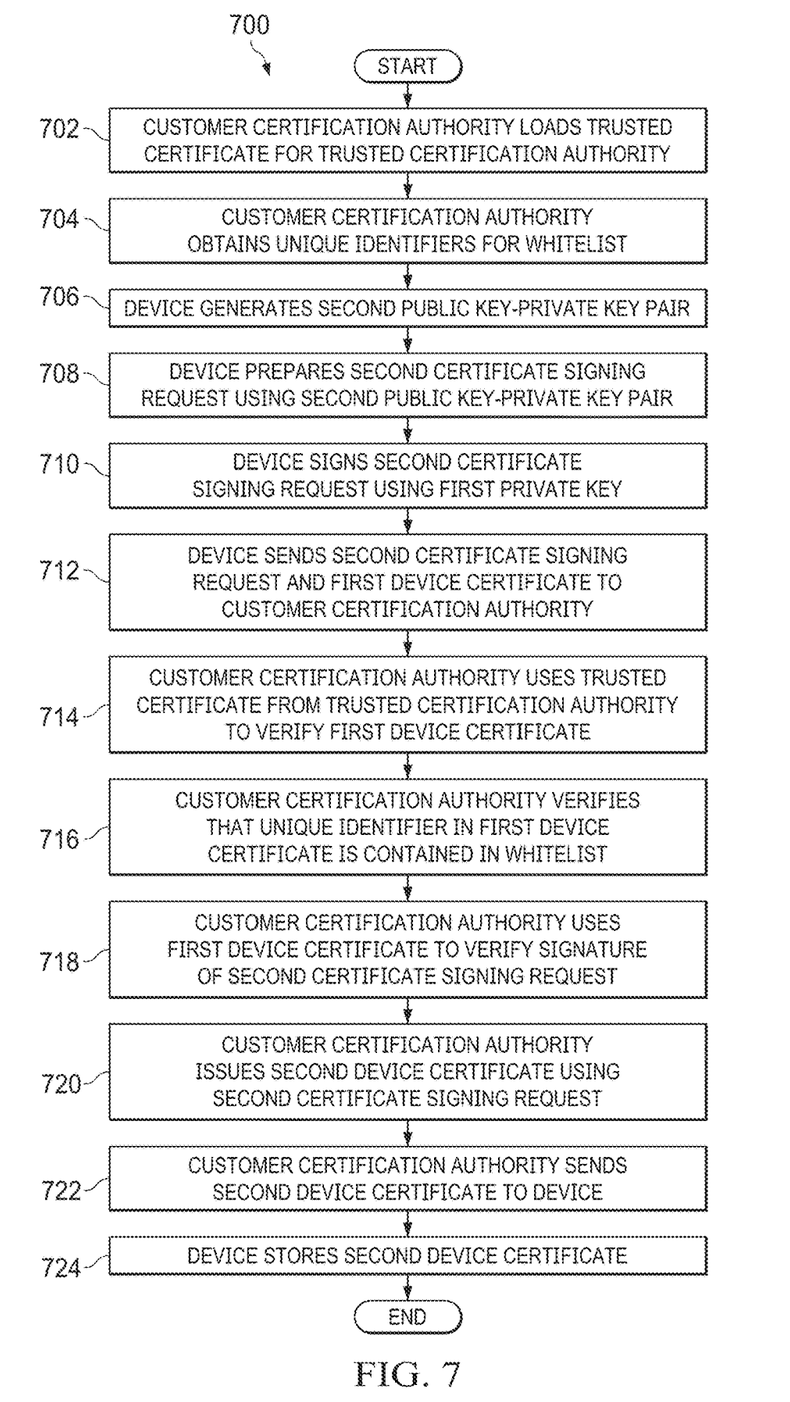

FIGS. 6 and 7 illustrate example methods 600 and 700 for automated certificate enrollment for devices in industrial control systems or other systems according to this disclosure. For ease of explanation, the methods 600 and 700 are described as being performed using the device 302 and the CA node 304. However, the methods 600 and 700 could be used by any suitable device and in any suitable system.

In FIG. 6, the method 600 is used for automated device enrollment in order to provision a device 302 that is being installed at a customer's site. During this process, the device 302 obtains an additional device certificate that is issued by the customer's own certificate authority 318 in the customer CA node 304, rather than from the device manufacturer's CA node 304.

As shown in FIG. 6, a customer certification authority obtains a trusted certificate for a trusted certification authority at step 602. This could include, for example, the customer's CA node 304 using its communications unit to obtain a digital certificate associated with the device manufacturer's CA node 320. This digital certificate enables the CA node 304 to verify whether devices 302 contain valid device certificates 404 issued by the CA node 320. Note that this step may need to be performed only once per device manufacturer, regardless of the number of devices 302 from that device manufacturer that request key certificates.

A device generates a second public key-private key pair at step 604. This could include, for example, the device 302 using its cryptographic chip or processor to generate a second pair of cryptographic keys, including a second public key (denoted PK2) and a second private or secret key (denoted SK2). The device prepares a second certificate signing request using the second public key-private key pair at step 606. This could include, for example, the device 302 using its cryptographic chip or processor to generate a second certificate signing request (denoted CSR2) using the second public key PK2 and the second private or secret key SK2. The second certificate signing request CSR2 requests that a certification authority issue a public key certificate for the device 302, where the public key certificate identifies the device 302 as the owner of the second public key PK2.

The device signs the second certificate signing request using its first private key at step 608. This could include, for example, the device 302 using its cryptographic chip or processor to digitally sign the second certificate signing request CSR2 using the device's first private or secret key SK1. The device sends the second certificate signing request along with its first device certificate to the customer certification authority at step 610. This could include, for example, the device 302 using its communications unit to transmit the second certificate signing request CSR2 and the first device certificate Cert1 (device certificate 404 from the memory 402) to the customer's CA node 304.

The customer certification authority uses the trusted certificate to verify the first device certificate at step 612. This could include, for example, the CA node 304 using its cryptographic chip or processor to determine whether the first device certificate Cert1 received from the device 302 was digitally signed by the CA node 320. If so, this provides an indication that the device 302 comes from a valid (non-counterfeit) source. The customer certification authority uses the first device certificate to verify the signature of the second certificate signing request at step 614. This could include, for example, the CA node 304 using its cryptographic chip or processor to determine whether the second certificate signing request CSR2 was signed by the first private or secret key SK1 of the device 302. If so, this provides an indication that the second certificate signing request CSR2 comes from a valid device 302.

If the first device certificate and the signature of the second certificate signing request are verified, the customer certification authority issues a second device certificate for the device using the second certificate signing request at step 616. This could include, for example, the customer's CA node 304 using its cryptographic chip or processor to generate a second device certificate (denoted Cert2) based on at least some of the contents of the second certificate signing request CSR2. The customer certification authority sends the second device certificate to the device at step 618. This could include, for example, the customer's CA node 304 using its communications unit to transmit the second device certificate Cert2 to the device 302. The device stores the second device certificate at step 620. This could include, for example, the device 302 using its communications unit to receive the second device certificate Cert2 from the CA node 304. This could also include the device 302 storing the second device certificate Cert2 in a non-volatile (and possibly secure tamper-proof or tamper-resistant) memory 402 as a site application certificate 406.

At this point, the device 302 has a certificate 406 that has been issued by the customer's own CA node 304. The certificate 406 can then be used in various security protocols with other peers that trust the customer's certificate authority 318. As a result, the device 302 is able to obtain one or more key certificates 406 in addition to the device certificate 404 issued by the device manufacturer.

Note that the method 600 shown in FIG. 6 provides for full automation of the device certificate provisioning with the customer's certificate authority 318. However, there might be a security requirement that requires the customer's certificate authority 318 to issue device certificates only to approved devices. There are various ways this could be supported in the architecture 300 of FIG. 3. One way to support this is through the use of device passwords, but this can be problematic as described above.

Another technique to allow certificate enrollment only for authorized devices involves creating and maintaining a whitelist of authorized devices on the CA node 304. For instance, each device certificate 404 issued by the manufacturer's CA node 320 could contain a unique identifier, such as a device serial number, medium access control (MAC) address, or Internet Protocol (IP) address. The unique identifiers could be identified by the CA node 304 using the manufacturer's device certificates 404. If the serial number or other unique identifier is visible on the device 302 or otherwise obtainable, the unique identifier could also be entered into the whitelist of the CA node 304, such as by personnel typing or scanning the unique identifier.

In whatever case, the unique identifier for each device 302 is added to the whitelist before the device 302 attempts to enroll with the customer's CA node 304 and receive a certificate 406 from the CA node 304. During device enrollment using the above-described techniques, the customer's certificate authority 318 will be able to verify whether a device certificate 404 signed by the manufacturer's CA node 320 contains a whitelisted identifier and, if so, provide a certificate 406 to the device 302. Note that other cryptographic mechanisms, such as raw public keys, could also be used to obtain validation of unique identifiers against the whitelist.

In FIG. 7, the method 700 is used for automated device enrollment in order to provision a device 302 that is being installed at a customer's site. During this process, the device 302 obtains an additional device certificate that is issued by the customer's own certificate authority 318 in the customer CA node 304, rather than from the device manufacturer's CA node 304. Moreover, the customer's certificate authority 318 can verify that the device 302 is whitelisted prior to issuing the additional device certificate to the device 302.

As shown in FIG. 7, a customer certification authority obtains a trusted certificate for a trusted certification authority at step 702. This could include, for example, the customer's CA node 304 using its communications unit to obtain a digital certificate associated with the device manufacturer's CA node 320. This digital certificate enables the CA node 304 to verify whether devices 302 contain valid device certificates 404 issued by the CA node 320. Note that this step may need to be performed only once per device manufacturer, regardless of the number of devices 302 from that device manufacturer that request key certificates.

The customer certification authority obtains one or more unique identifiers for a whitelist at step 704. This could include, for example, the customer's CA node 304 using its communications unit or I/O unit to obtain one or more unique identifiers (such as serial numbers, MAC addresses, or IP addresses). The unique identifiers identify the devices 302 that are authorized to register with the customer's CA node 304 and obtain certificates 406 from the CA node 304. In some cases, the unique identifiers could be entered manually, such as when a user types an identifier into the CA node 304 or manually scans an optical code on a device 302. In other cases, the unique identifiers could be obtained automatically, such as when the manufacturer's CA node 320 transmits device certificates 404 or unique identifiers to the CA node 304 for devices 302 being provided to the customer.

A device generates a second public key-private key pair at step 706. This could include, for example, the device 302 using its cryptographic chip or processor to generate a second pair of cryptographic keys, including a second public key PK2 and a second private or secret key SK2. The device prepares a second certificate signing request using the second public key-private key pair at step 708. This could include, for example, the device 302 using its cryptographic chip or processor to generate a second certificate signing request CSR2 using the second public key PK2 and the second private or secret key SK2. The second certificate signing request CSR2 requests that a certification authority issue a public key certificate for the device 302, where the public key certificate identifies the device 302 as the owner of the second public key PK2.

The device signs the second certificate signing request using its first private key at step 710. This could include, for example, the device 302 using its cryptographic chip or processor to digitally sign the second certificate signing request CSR2 using the device's first private or secret key SK1. The device sends the second certificate signing request along with its first device certificate to the customer certification authority at step 712. This could include, for example, the device 302 using its communications unit to transmit the second certificate signing request CSR2 and the first device certificate Cert1 (device certificate 404 from the memory 402) to the customer's CA node 304.

The customer certification authority uses the trusted certificate to verify the first device certificate at step 714. This could include, for example, the CA node 304 using its cryptographic chip or processor to determine whether the first device certificate Cert1 received from the device 302 was digitally signed by the CA node 320. If so, this provides an indication that the device 302 comes from a valid (non-counterfeit) source. The customer certification authority verifies that the device's unique identifier is contained in the whitelist at step 716. This could include, for example, the CA node 304 using its cryptographic chip or processor to determine whether the unique identifier of the device 302 contained in the first device certificate Cert1 was previously provided to the CA node 304 and is listed in the whitelist of the CA node 304. If so, this provides an indication that the device 302 has been previously authorized to register with the CA node 304 and receive a certificate 406. The customer certification authority uses the first device certificate to verify the signature of the second certificate signing request at step 718. This could include, for example, the CA node 304 using its cryptographic chip or processor to determine whether the second certificate signing request CSR2 was signed by the first private or secret key SK1 of the device 302. If so, this provides an indication that the second certificate signing request CSR2 comes from a valid device 302.

If the first device certificate and the signature of the second certificate signing request are verified and the device's unique identifier is whitelisted, the customer certification authority issues a second device certificate for the device using the second certificate signing request at step 720. This could include, for example, the customer's CA node 304 using its cryptographic chip or processor to generate a second device certificate Cert2 based on at least some of the contents of the second certificate signing request CSR2. The customer certification authority sends the second device certificate to the device at step 722. This could include, for example, the customer's CA node 304 using its communications unit to transmit the second device certificate Cert2 to the device 302. The device stores the second device certificate at step 724. This could include, for example, the device 302 using its communications unit to receive the second device certificate Cert2 from the CA node 304. This could also include the device 302 storing the second device certificate Cert2 in a non-volatile (and possibly secure tamper-proof or tamper-resistant) memory 402 as a site application certificate 406.

At this point, the device 302 has a certificate 406 that has been issued by the customer's own CA node 304 after the customer's CA node 304 has verified that the device 302 is allowed to be authorized. The certificate 406 can then be used in various security protocols with other peers that trust the customer's certificate authority 318. As a result, the device 302 is able to obtain one or more key certificates 406 in addition to the device certificate 404 issued by the device manufacturer. Compared to conventional approaches where a CA-generated password must be transferred to a device 302 over a secure channel, the automated device enrollment technique of FIG. 7 does not require any secure channel to the device 302. This is because the actual insertion of the unique identifier into the customer certification authority's whitelist can be done outside the device network in the customer's trusted zone.

Although FIGS. 6 and 7 illustrate examples of methods 600 and 700 for automated certificate enrollment for devices in industrial control systems or other systems, various changes may be made to FIGS. 6 and 7. For example, while each method is shown as a series of steps, various steps in each method could overlap, occur in parallel, occur in a different order, or occur any number of times. Also, various cryptographic mechanisms can be used for communication and verification in the methods 600 and 700. For instance, in the above processes, the device 302 can sign its certificate signing requests in any suitable manner, such as when the certificate signing requests are signed using a private key without a corresponding certificate or other cryptographic mechanisms.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving, from a device, (i) a certificate request for a certification authority and (ii) a first digital certificate, wherein the certificate request is digitally signed by the first device and the first digital certificate is stored in the device;
verifying, at the certification authority, the first digital certificate using a second digital certificate of another certification authority;
verifying a digital signature of the certificate request using the first digital certificate;
after verifying the first digital certificate and the digital signature, transmitting a second digital certificate to the device;
wherein the first digital certificate comprises a digital certificate issued by the other certification authority that is associated with a manufacturer of the device; and
wherein the second digital certificate comprises a digital certificate issued by the certification authority that is associated with a customer installing or using the device.

2. The method of claim 1, further comprising:
obtaining a unique identifier associated with the device; and
determining whether the unique identifier is contained in a whitelist of the certification authority;
wherein the second digital certificate is transmitted to the device after determining that the unique identifier is contained in the whitelist.

3. The method of claim 2, wherein the unique identifier comprises a serial number, a medium access control (MAC) address, or an Internet Protocol (IP) address of the device.

4. The method of claim 2, further comprising:
receiving multiple unique identifiers; and
placing the multiple unique identifiers in the whitelist.

5. The method of claim 2, wherein: the unique identifier comprises at least one of: a serial number and an Internet Protocol (IP) address of the device.

6. An apparatus configured to provide a certification authority, the apparatus comprising:
at least one memory configured to store a first digital certificate;
at least one processor configured to:
receive, from a device, (i) a certificate request for the certification authority and (ii) the first digital certificate, wherein the certificate request is digitally signed by the first device and the first digital certificate is stored in the device;
verify the first digital certificate using a second digital certificate of another certification authority;
verify a digital signature of the certificate request using the first digital certificate; and
after verifying the first digital certificate and the digital signature, initiate transmission of a second digital certificate to the device, wherein: the first digital certificate comprises a digital certificate issued by the other certification authority that is associated with a manufacturer of the device; and the second digital certificate comprises a digital certificate issued by the certification authority that is associated with a customer installing or using the device.

7. The apparatus of claim 6, wherein:
the at least one processor is further configured to:
  obtain a unique identifier associated with the device; and
  determine whether the unique identifier is contained in a whitelist of the certification authority; and
the at least one processor is configured to initiate transmission of the second digital certificate to the device after determining that the unique identifier is contained in the whitelist.

8. The apparatus of claim 7, wherein the unique identifier comprises a serial number, a medium access control (MAC) address, or an Internet Protocol (IP) address of the device.

9. The apparatus of claim 7, wherein the at least one processor is further configured to:
  receive multiple unique identifiers; and
  place the multiple unique identifiers in the whitelist.

10. The apparatus of claim 7, wherein: the unique identifier comprises a medium access control (MAC) address and an Internet Protocol (IP) address of the device.

11. A method comprising:
generating a key pair having first and second keys associated with a device;
generating a certificate request associated with the key pair;
digitally signing the certificate request;
transmitting the certificate request and a first digital certificate stored in the device to a certification authority; and
in response to the certification authority verifying the first digital certificate and a digital signature of the certificate request, receiving a second digital certificate from the certification authority and storing the second digital certificate in the device;
wherein the first digital certificate comprises a digital certificate issued by the other certification authority that is associated with a manufacturer of the device; and
wherein the second digital certificate comprises a digital certificate issued by the certification authority that is associated with a customer installing or using the device.

12. The method of claim 11, wherein:
the certificate request is digitally signed using a third key; and
the third key comprises a private or secret key associated with the first digital certificate.

13. The method of claim 11, wherein the second digital certificate is received from the certification authority without the device providing a password to the certification authority.

14. The method of claim 11, wherein the first digital certificate comprises a digital certificate issued by another certification authority that is associated with a manufacturer of the device.

15. The method of claim 11, wherein the second digital certificate comprises a digital certificate issued by the certification authority during installation of the device in a system.

16. An apparatus comprising:
at least one memory configured to store a first digital certificate; and
at least one processor configured to:
  generate a key pair having first and second keys associated with the apparatus;
  generate a certificate request associated with the key pair;
  digitally sign the certificate request;
  initiate transmission of the certificate request and the first digital certificate to a certification authority; and
  in response to the certification authority verifying the first digital certificate and a digital signature of the certificate request, receive a second digital certificate from the certification authority and store the second digital certificate in the at least one memory;
wherein the first digital certificate comprises a digital certificate issued by the other certification authority that is associated with a manufacturer of the device; and
wherein the second digital certificate comprises a digital certificate issued by the certification authority that is associated with a customer installing or using the device.

17. The apparatus of claim 16, wherein:
the at least one processor is configured to digitally sign the certificate request using a third key; and
the third key comprises a private or secret key associated with the first digital certificate.

18. The apparatus of claim 16, wherein the at least one processor is configured to receive the second digital certificate from the certification authority without providing a password to the certification authority.

19. The apparatus of claim 16, wherein the at least one processor is further configured to:
obtain a unique identifier associated with the device; and
determine whether the unique identifier is contained in a whitelist of the certification authority;
wherein the second digital certificate is transmitted to the device after determining that the unique identifier is contained in the whitelist.

20. The apparatus of claim 19, wherein the unique identifier comprises at least one of: a serial number, a medium access control (MAC) address, and an Internet Protocol (IP) address of the device.

* * * * *